US011331628B2

(12) United States Patent
Johnson et al.

(10) Patent No.: US 11,331,628 B2
(45) Date of Patent: May 17, 2022

(54) VAPOR CONDENSER ENHANCED BY MEMBRANE EVAPORATION

(71) Applicant: DAIS ANALYTIC CORPORATION, Odessa, FL (US)

(72) Inventors: Brian Johnson, Tampa, FL (US); Rasool Nasr Isfahani, Tampa, FL (US)

(73) Assignee: DAIS ANALYTIC CORPORATION, Odessa, FL (US)

( * ) Notice: Subject to any disclaimer, the term of this patent is extended or adjusted under 35 U.S.C. 154(b) by 0 days.

(21) Appl. No.: 16/643,301

(22) PCT Filed: Aug. 29, 2018

(86) PCT No.: PCT/US2018/048501
§ 371 (c)(1),
(2) Date: Feb. 28, 2020

(87) PCT Pub. No.: WO2019/046397
PCT Pub. Date: Mar. 7, 2019

(65) Prior Publication Data
US 2020/0330923 A1 Oct. 22, 2020

Related U.S. Application Data

(60) Provisional application No. 62/551,537, filed on Aug. 29, 2017.

(51) Int. Cl.
*B01D 61/36* (2006.01)
*C02F 1/44* (2006.01)

(52) U.S. Cl.
CPC ......... *B01D 61/366* (2013.01); *B01D 61/362* (2013.01); *C02F 1/448* (2013.01);
(Continued)

(58) Field of Classification Search
CPC .................. B01D 61/36; B01D 61/362; B01D 2311/2669; B01D 2313/22; B01D 2313/38; C02F 1/448; C02F 2103/023
See application file for complete search history.

(56) References Cited

U.S. PATENT DOCUMENTS

2010/0170776 A1* 7/2010 Ehrenberg ........... B01D 63/085
202/168
2011/0266219 A1* 11/2011 Meuleman ............ B01D 63/02
210/640
(Continued)

FOREIGN PATENT DOCUMENTS

| CN | 102826700 | 12/2012 |
|---|---|---|
| CN | 103387308 | 11/2013 |

(Continued)

OTHER PUBLICATIONS

Zhu Chunjun et al.—GN 102826700 A Machine Translation—Dec. 19, 2012 (Year: 2012).*
(Continued)

*Primary Examiner* — Bradley R Spies
(74) *Attorney, Agent, or Firm* — Saliwanchik, Lloyd & Eisenschenk

(57) ABSTRACT

A membrane evaporative condenser (MEC) includes a repeating sequence of channels for evaporation and/or condensation are arranged, each sequence of channels includes a condensation channel for condensation of a vapor to a liquid, an evaporation channel, and zero to one hundred evaporation-condensation channels. The condensation channel has walls of a non-permeable material which exterior to the condensation channel share the wall with a liquid evaporative medium (LEM) conduit that contains a LEM. The LEM conduit includes a moisture transfer membrane (MTM), where the LEM can evaporate into an evaporation channel or an evaporation-condensation channel that can amplify the effect of the heat transfer for additional mass transfer.

16 Claims, 5 Drawing Sheets

(52) U.S. Cl.
CPC *B01D 2311/106* (2013.01); *B01D 2311/2642* (2013.01); *B01D 2311/2669* (2013.01); *B01D 2313/22* (2013.01); *B01D 2313/38* (2013.01)

(56) References Cited

U.S. PATENT DOCUMENTS

| | | |
|---|---|---|
| 2013/0153497 A1 | 6/2013 | Arafat |
| 2013/0298766 A1* | 11/2013 | Ehrenberg ........... B01D 53/268 |
| | | 95/52 |
| 2014/0216916 A1 | 8/2014 | Heinzl |

FOREIGN PATENT DOCUMENTS

| | | |
|---|---|---|
| CN | 103732311 | 4/2014 |
| CN | 106512738 | 3/2017 |
| DE | 102013220199 | 4/2015 |
| RU | 2040314 | 7/1995 |
| WO | 2012/048788 | 4/2012 |
| WO | 2016/183477 | 11/2016 |

OTHER PUBLICATIONS

Dais—Dais Analytic Ships Largest Order in 14-Year History—2014 (Year: 2014).*

International Search Report and Written Opinion, PCT International Application No. PCT/US2018/048501, PCT/ISA/210, PCT/ISA/237, dated Dec. 6, 2018.

* cited by examiner

VAPOR CONDENSER ENHANCED BY MEMBRANE EVAPORATION

CROSS-REFERENCE TO RELATED APPLICATIONS

This application is a national stave application of International Application No. PCT/US2018/048501, filed Aug. 29, 2018, which claims the benefit of U.S. Provisional Application Ser. No. 62/551,537, filed Aug. 29, 2017, the disclosures of which are incorporated herein by reference in their entirety, including all figures, tables and drawings.

BACKGROUND OF THE INVENTION

Phase change of heat transfer media is used to efficiently move heat energy. Commonly, a condenser is used to transfer heat from of a vapor so that it reaches saturation and condenses into a liquid with the release of heat that is transferred through a non-permeable surface to a working fluid that transfers the heat to the ultimate heat sink via a second, separate process. The working fluid may be a gas, such as ambient air, where the heated fluid mixes with the atmosphere to effectively dissipate the thermal input. Although simply affected, the saturation temperature of the working fluid within the condenser must exceed the dry-bulb temperature of the working fluid. Because no mass exchange occurs, the working fluid temperature rises as it absorbs heat. Since the density and specific heat of air are very low relative to the heat released by the phase change of a vapor condensing, a large volumetric flow is needed to keep the temperature rise of the working fluid from increasing the saturation temperature. The use of a liquid coolant, typically water, to transfer the heat to a separate evaporative cooling device, a cooling tower, lowers the required saturation temperature of the condenser.

When water is evaporating into the cooling air, it need only exceed the wet-bulb temperature of the cooling air, which much of the time, is significantly lower than the dry-bulb temperature. A negative to having a separate cooling tower is that the condenser's cooling is only sensible; limiting the working fluid's temperature rise and requiring a high flow rate. Conventional cooling tower technology imposes strict limits on the concentration of dissolved solids in the evaporating fluid to avoid formation of scale deposits. Additionally, a safety issue arises from the release of small water droplets into the environment, as these droplets can carry deadly bacteria such as *legionella*. This obliges careful maintenance and regular dosing with chlorine or other oxidants, which imposes liability and a labor workload that typically limits cooling tower application to larger installations.

Various attempts have been made over the years to combine cooling tower and condenser components by spraying liquid water onto the surface of a heat exchanger to allow evaporative cooling of a thin film of fluid directly covering the heat exchange surface opposed to the surface where condensation is occurring. Combining evaporative cooling with vapor condensation allows the benefit of evaporative cooling in a single component that improves packaging and eliminates pumping to transfer water. Because the phase change heat released from the condensing vapor is conducted with a negligible resistance to the phase change heat absorption of evaporative cooling, the working fluid's flow rate needs not be high to cope with a temperature gain as with sensible heat exchanges.

The total evaporation of working fluid, such as water, tends to leave scale deposits on the heat exchange surfaces, which decrease performance severely. When the thickness of and evaporation rate in the water film cannot be controlled reliably, operators limit the dissolved solid concentration of the working fluid in the same manner that conventional cooling tower operators do. The exposed water being atomized into an ambient air stream is a potential source of bacteria, just as with cooling towers.

These shortcomings of the state of the art could be addressable by single components that combine a selective membrane having an appropriate geometry of flow channels with a support structure that are secured together without use of additional spacer, where the complex 3D geometries generate an efficiency increase. To this end, practical membrane evaporative condensers and their inclusion in systems for cooling and dehumidification are presented.

BRIEF SUMMARY OF THE INVENTION

Embodiments of the invention are directed to a membrane evaporative condenser (MEC) where a repeating sequence of channels for evaporation and/or condensation are arranged, each sequence of channels includes a condensation channel for condensation of a vapor to a liquid, an evaporation channel, and zero to one hundred evaporation-condensation channels. The condensation channel has at least one vapor inlet and at least one outlet for liquid and/or vapor and resides between two walls of a non-permeable material, where all walls of the non-permeable material of condensation channels that do not terminate the repeating sequence of channels comprise a wall shared with an adjacent LEM conduit for containment of a liquid evaporative medium (LEM). The LEM conduit resides between a first wall of the non-permeable material and a second wall including a moisture transfer membrane (MTM), whose surface of the MTM outside of the LEM conduit is a site for evaporating the LEM from the LEM conduit. The LEM conduit includes one or more LEM inlets to the LEM conduit. In some embodiments of the invention, the MEC includes one or more evaporation-condensation channels, each evaporation-condensation channel is defined by a LEM conduit, a second wall of the non-permeable material, which provides a site for condensation of the LEM to an LEM condensate that evaporates from the MTM, a LEM inlet to the LEM conduit, an LEM outlet to the LEM conduit, and an outlet for the LEM condensate. The evaporation channel has all of the walls that do not terminate the repeating sequence of channels being LEM conduits where the space between the MTMs of the LEM conduits or a terminal space between the MTM and a non-permeable wall of a terminal evaporation channel allows transport of a gaseous working fluid from one or more dry working fluid inlet to one or more wet working fluid outlet.

According to an embodiment of the invention, the MEC can be a repeating sequence of alternating condensation channels and evaporation channels. In another embodiment of the invention, there can be 1 to 10, or even up to 100 evaporation-condensation channels situated between a condensation channel and the evaporation channel in the sequence of channels.

The MTM can be Aqualyte™ with the LEM is water. The LEM can be from one source or a plurality of sources that are the same or different material. When the LEM is non-potable water the MEC can function as a water purifier as the LEM condensate can be pure water. The non-potable water can be filtered to remove solids that might foul an LEM conduit. The filter can be about 20 microns or finer. The LEM of the evaporation channel and the LEM of the evaporation-condensation channel can be from different sources.

In an embodiment of the invention, the MEC can employ a vapor compression device. For example, the wet working fluid from the evaporation channel can be the input to the compression device and the output of the compression device can be delivered to the vapor inlet of the condensation channel. One or more pumps can be coupled to at least one of the condensation channel, the evaporation-condensation channel, and the evaporation channel.

In an embodiment of the invention, the MEC includes at least one evaporative chiller and dehumidifier, each having an LEM channel between a first MTM and a second MTM, with a vacuum evaporation conduit between the first MTM and a first wall of a non-porous material, and a condensation conduit between the second MTM and a second wall comprising a non-porous material wherein the wet working fluid outlet of the evaporation channel is connected to the condensation conduit.

Embodiments of the invention are directed to a method of preparing an MEC, as described above. In one embodiment, the method involves providing a plurality of condensation channels and evaporation channels in an alternating sequence, connecting the vapor inlets to at least one conduit for connection to a vapor source, connecting the LEM inlets to at least one conduit for connection to a LEM source, connecting the dry working fluid inlet to at least one conduit for connection to a dry working fluid source, connecting the liquid outlets to at least one conduit to at least one reservoir, recycling device, or drain, and, optionally, connecting the LEM outlets to at least one conduit to at least one reservoir, recycling device, or drain. In another embodiment of the invention, the method includes the additional steps of providing a plurality of evaporation-condensation channels and connecting the LEM condensate outlets to at least one conduit to at least one reservoir, recycling device, or drain. In another embodiment of the invention, the method also includes providing at least one evaporative chiller and dehumidifier, connecting the wet working fluid outlet to the condensation conduit, and connecting the vacuum evaporation conduit to a vacuum source. The vacuum source is an aspirator connected to a fluid flow within the MEC.

DETAILED DESCRIPTION OF THE INVENTION

Embodiments of the invention are directed to membrane evaporative condensers (MECs) where a condensing fluid, which can be water or any other practical condensable fluid, and a working fluid, which can be water or any other practical evaporative fluid, reside on opposite sides of a non-permeable heat transfer surface with a thin layer of the working fluid retained between the non-permeable heat transfer surface and a selectively permeable mass-transport membrane. The MEC can be included into any device that rejects enthalpy from a condensing working fluid that: modifies a temperature or moisture level of a building or other enclosure, such as an HVAC application; circulates as part of a process; is part of a distillation device that isolates one fluid from a solution or mixture; performs crystallization to concentrate dissolved solids in solution until precipitation commences; or is part of a thermal process for treating water or other liquids by removing nonvolatile compounds. A cross-section of the MEC is illustrated in FIG. 1.

Figure 1:
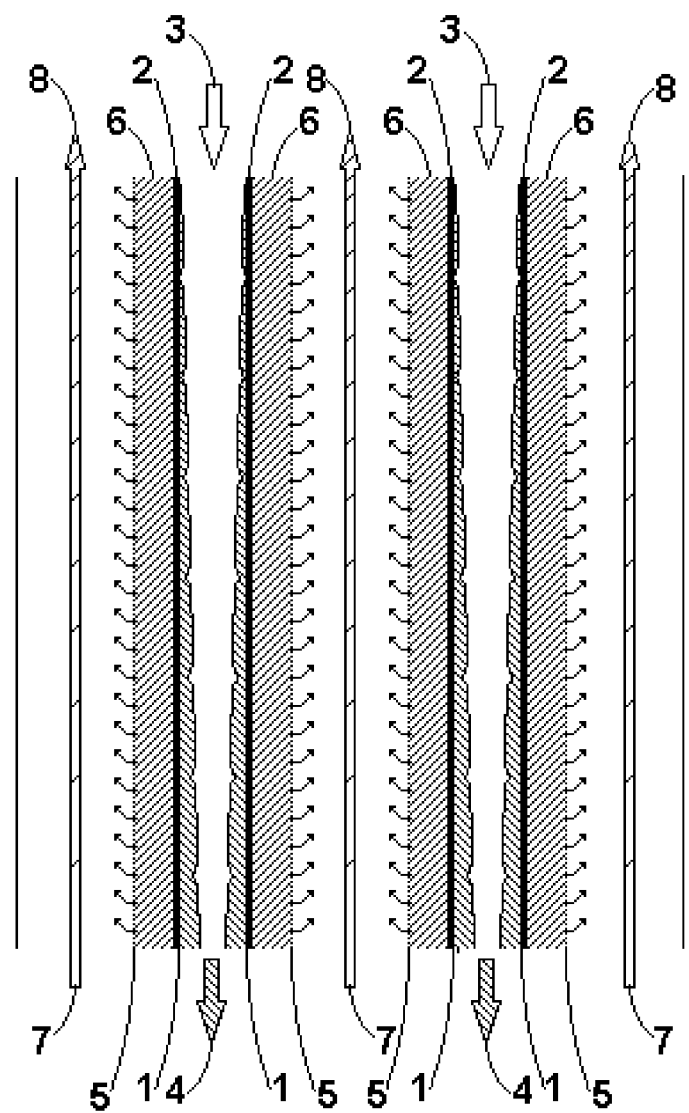
FIG. 1 shows a membrane evaporative condenser (MEC), according to an embodiment of the invention, with a repeating series of condensation channels and evaporation channels.

As illustrated in FIG. 1, two non-permeable heat transfer surface 1 define a channel for transport with gravity of a condensing vapor 3, such as, but not limited to, steam, which enters and progresses through the channel. The condensing vapor 3 providing heat that is transferred through the non-permeable heat transfer surfaces 1 of wall 2 of a heat exchange medium (HEM), which can be the surface of a metal or other material film displaying a sufficiently high heat transfer coefficient and any needed resistance to pressure and corrosion. The condensing vapor undergoes condensation and exits the channel as a liquid 4. Heat from the condensing vapor is provided through the wall 2 into a liquid evaporative medium (LEM) contained in a LEM conduit 6 defined by wall 2 and a permeable membrane (PM) 5. The LEM can be water or any other liquid fluid that can evaporate with the heat provided by the condensing vapor. Vapor passes through the PM 5, which for water can be a moisture transfer membrane (MTM), and the PM is recited herein as a MTM, though it is to be understood that the MTM can be a PM for some chemical other than water and these other LEMs can be used with a MTM where the "moisture" is a liquid other than water. Where water and/or steam are recited, the water represents any other appropriate liquid and the steam represents any appropriate vapor. The moisture passing through the MTM 5 and evaporates into a gas stream that comprised a working fluid that enters an evaporation channel defined between two MTMs 5's as a relatively "dry" gas 7 and exits as a relatively "wet" gas 8. The "dry" gas being one without vapor from the LEM and the "wet" gas is a vapor comprising at least some LEM vapor. The dry gas, as used herein, is a gas that can absorb additional LEM vapor at the working temperature and a wet gas, as used herein, is a gas from which LEM vapor can condense at the working temperature. Although the working temperature can be different in the condensation channel and the evaporation channel can be of the same temperature. Though as shown, the MEC displays only two channels for the condensing medium and three channels for evaporation from the MTM, with the two outside channels for evaporation defined by one MTM and a containing wall, the MEC, according to embodiments of the invention, is not so limited can include multiple repeating pairs of channels for condensation and evaporation. The outside channels can be independently for condensation or for evaporation.

The heat provided for evaporation is ultimately provided by the condensation of the condensing vapor 3 to the liquid 4, for example, steam condensing to water. The working fluid can be air and the LEM can be water. The LEM can be in flow, or can be effectively in a closed channel that remains filled by contact with an LEM source. A flow to the LEM promotes mixing to maintain a nearly constant thermal and, when the LEM is a solution a constant concentration profile, across the thickness of the conduit within the LEM conduit. The MEC, according to embodiments of the invention, has a number of advantageous qualities including, but not limited to: allowing a single component to replace the typical combination of liquid-cooled condenser and cooling tower currently used; because the MEC interacts with the working fluid by mass transfer, the condensing fluid saturation temperature needs only to exceed the wet-bulb temperature of the working fluid; by eliminating circulation of the evaporative medium from a condenser to a separate cooling tower, the MEC eliminates the dependence between the temperature differentials and mass flow rate of the evaporative medium; allowing a significant size reduction and the possibility the total elimination of a circulation pump and its parasitic power requirements; and to avoid direct evaporation with the formation of very small airborne droplets or a thin continuous film of the evaporative medium for effective heat transfer that occurs without an MTM to mediate the mass transfer of the LEM.

The MECs, according to embodiments of the invention, can be included in: enhanced HVAC systems, as disclosed in U.S. Pat. No. 8,470,071; fluid treatment systems, as disclosed in U.S. Pat. No. 9,283,518; evaporative chilling systems, as disclosed in PCT Application No. PCT/US2016/056064; or compact membrane-based heat and mass exchangers, as disclosed in U.S. patent application Ser. No. 15/969,449. All of these disclosures are incorporated by reference herein. By evaporation from a thin channel of an LEM maintained between a non-permeable material and a permeable membrane, an efficient transfer of heat from a fluid contacting the surface of the non-permeable material opposite the channel to a fluid contacting the surface of the MTM opposite the LEM channel. Herein, condensable or evaporative fluids are often stated to be water, air, and steam but, as would be appreciated by one of skill in the art, other chemical species can provide the same functions within the devises disclosed in this specification.

Figure 2:
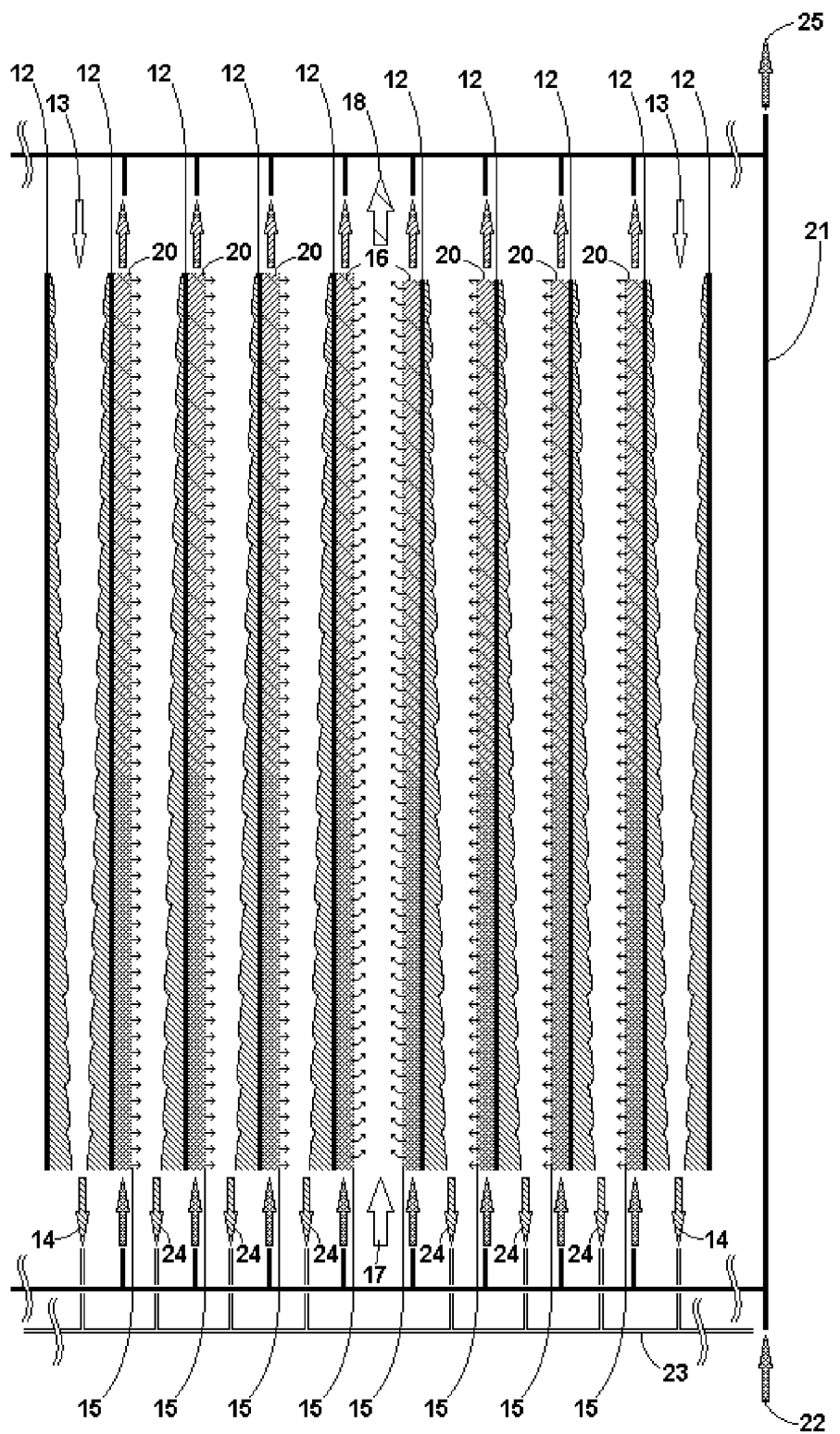
FIG. 2 shows a multiple-effect MEC where a plurality of evaporation-condensation channels are inserted between each pair of the condensation channels and evaporation channels, according to an embodiment of the invention.
Figure 3:
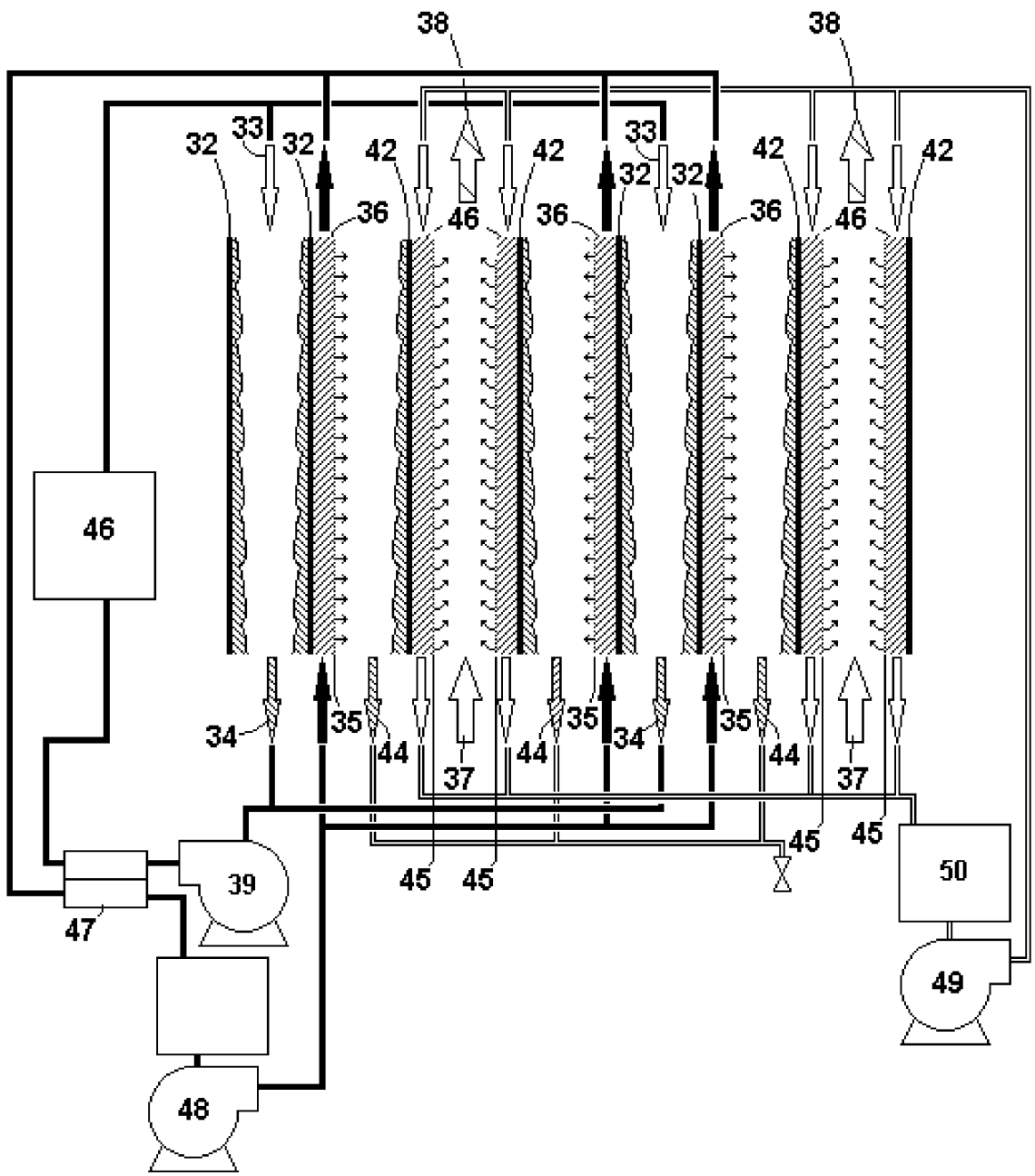
FIG. 3 shows a multiple effect MEC where a plurality of evaporation-condensation channels are inserted between each pair of the condensation channels and evaporation channels with multiple sources of liquid evaporative medium (LEM) is used, according to an embodiment of the invention.
Figure 4:
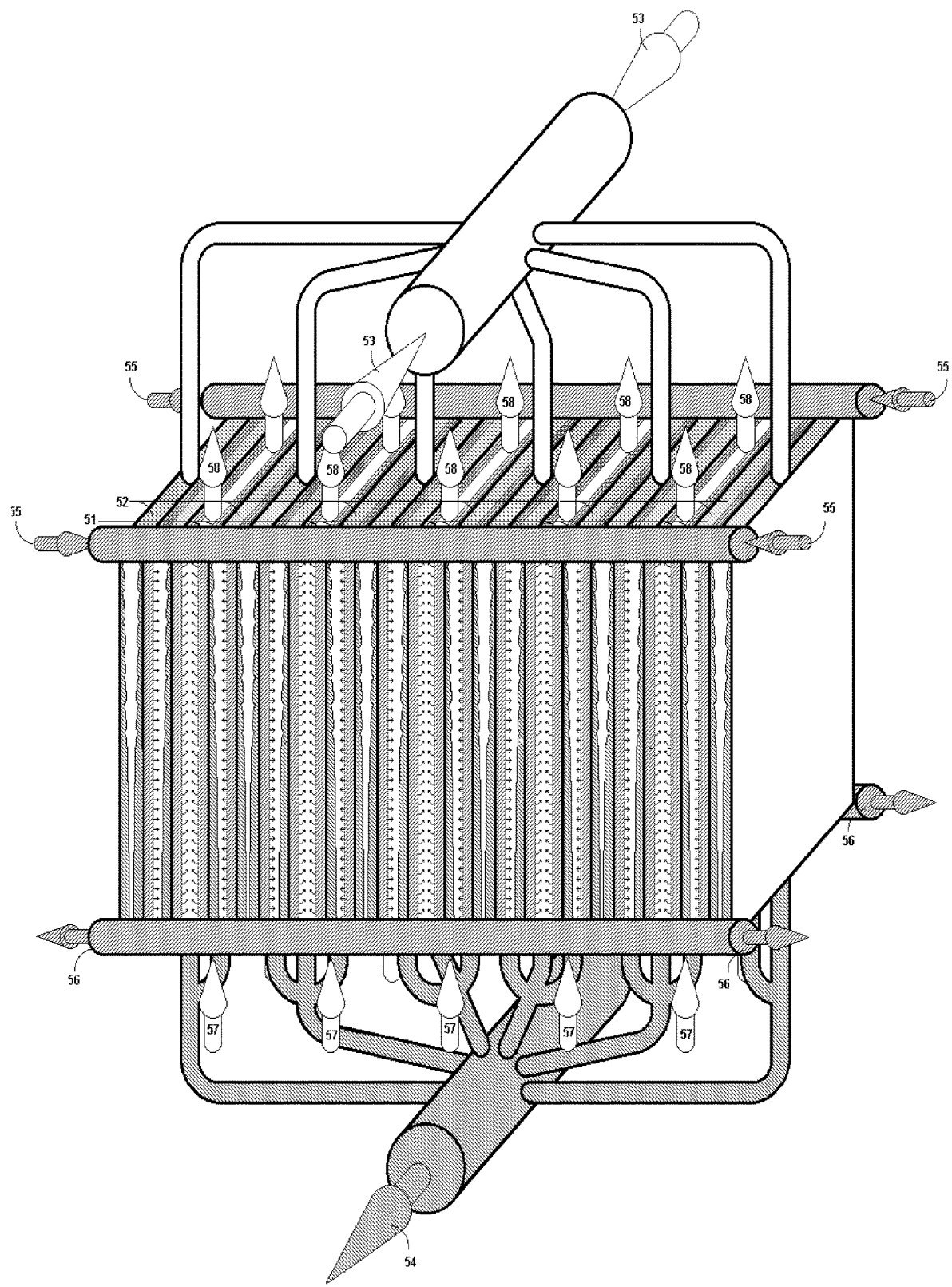
FIG. 4 shows an arrangement of the MEC including fluid inlets and outlets, according to an embodiment of the invention.
Figure 5:
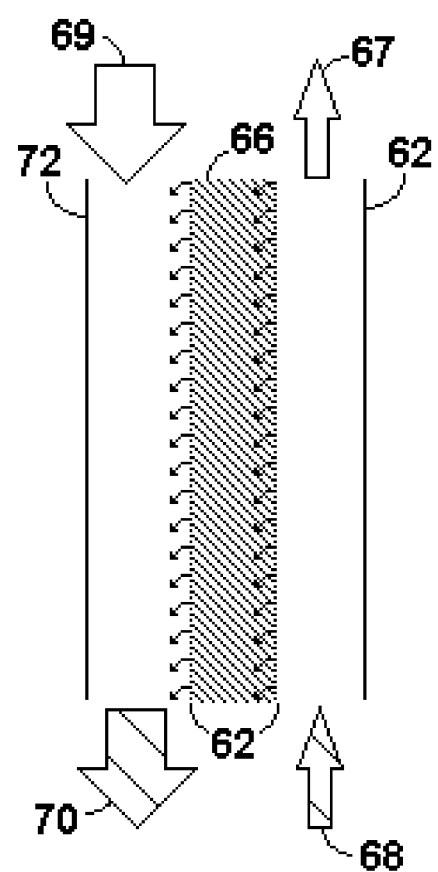
FIG. 5 shows an evaporative chiller and dehumidifier that can be included in the MEC, according to an embodiment of the invention.

In an embodiment of the invention, the channel for condensation and evaporation can be partitioned into multiple layers as a multiple-effect configuration MEC, as shown in FIG. 2 for a four layer configuration. The layers display a redundant series of condensation channels, for example a steam condensation channel, where a first channel is a steam condensation channel with entry for the condensing vapor 13 and exits as condensed liquid 14 centered between two non-permeable HEMs 12s contacting the LEM conduit 16, each contacting PM 15 on the faces of the HEM 12 that are distal to the steam condensation channel 13. In this configuration, the water vapor exiting the MTM 15 that shares a HEM 12 with the steam condensation channel and the water vapor condenses against an adjacent HEM 12 where the heat released at a first HEM drives evaporation from the LEM conduit 16 through the contacting MTM 15 into a secondary evaporation-condensation channel; where the condensate from the LEM conduit 16 condenses against a second HEM 12 allowing it to exit as to a secondary liquid 24. This cascade of condensation and evaporation in consecutive evaporation-condensation channel transmits the energy of the steam condensation through each layer of the cascade by successive evaporations and condensations. The initial energy input from the steam or other condensing medium is effectively re-used in the cascade, most effectively when the subsequent evaporation-condensation channel is at or near saturated in water or other condensable vapor. The number of subsequent evaporation-condensation channels can be one to ten or more, depending on the efficiency of heat transfer and the quality of the LEM in the LEM conduit 16. This increases the Gained Output Ratio (GOR) of the process, multiplying the amount of liquid evaporated for a given amount of thermal input. Ultimately, an $n^{th}$ subsequent evaporation-condensation channel has its HEM 12 shared with one where the LEM conduit 16 and its MTM 15 delivers the evaporated water or other vaporizable fluid into a gas stream that comprised a working fluid, such as air, that enters an evaporation channel defined between two MTMs 15's as a relatively "dry" gas 17 and exits as a relatively "wet" gas 18. The sequence between the condensation channel, through subsequent evaporation-condensation channels and the evaporation channel can be repeated a plurality of times, for example 2 to 100 or more times.

In an embodiment of the invention, the multiple-effect configuration MEC can be modified so that no working fluid is introduced as a "dry" gas 17, into the evaporation channel whose inlet being removed, valved off, or capped; the "wet" gas 18 exiting from the MEC is diverted to a vapor compression device, not shown, which can be a mechanical, electrochemical, or other form of compressor, instead of being condensed immediately. A valved inlet to the evaporation channel can be used to maintain a desired pressure of the evaporated vapor by removing or adding the vapor as required or desired to achieve the desired performance. The high-pressure vapor exiting the compressor is routed as the condensing vapor 13 to the first condensation channels, replacing the externally-supplied steam. This allows mechanical energy, typically supplied by an electric motor, to move heat inside the system, with the heat of condensation recaptured for evaporation at a different location. This heat pump effect can make the system more energy efficient than a thermally powered system.

According to an embodiment of the invention, the multiple-effect configuration MEC allows the steam condensed liquid 14 and the condensed liquid 24 provided by evaporation of the LEM to be combined in a conduit 23 and collected as pure water or other liquid. In this manner the LEM can be almost any quality of water, limited only by the amount of suspended solids. Hence, any non-potable water can be used upon filtration to remove particulates in excess of about 20 microns in dimension. The non-potable water used can be recycled through a conduit 21 of the MEC where unrecycled non-potable water can be added at an inlet 22 as required based on the removal of condensed liquid 24 and removed at an outlet 25 to maintain the required water portions to maintain the MEC's proper function.

The multiple-effect MEC, according to embodiments of the invention, achieve superior performance due to the features provided by the MTM interface. The MEC provides a reliable predetermined surface area for evaporation. The MTM ensures a continuous film of evaporative fluid free of local dry spots from developing and depositing scale on the surface. The LEM behind the MTM is pressurized by the column of fluid above it, so a circuit of fluid recovers the energy spent elevating the fluid to the top of the device. A conventional device without an MTM cannot sustain this pressure, requiring the pumping of liquid back to the top of the column against the elevation change. A distribution manifold within the LEM layer uses significantly less pressure to spread the flow evenly across the MTM surface than does spray nozzles used in many conventional evaporative cooling devices for distribute the evaporative fluid. Direct contact of the LEM with working fluids, as in cooling tower application, allows any airborne particles in the cooling flow to be captured by the working fluid. This disrupts an even flow of liquid allowing formation of local dry spot and causes the accumulation of dirty water in the open collection basin at the base of the tower, which requires frequent maintenance and result in the health hazard of mold grow.

By using a fouling-resistant membrane, such as a composite membrane with a solid pervaporation coating facing the evaporation medium, such as Aqualyte™, the LEM can be highly concentrated relative to a conventional cooling tower. Conventional towers are tending towards use of highly treated reclaimed water as an alternative to potable water, which is not required by MTMs, such as Aqualyte™, which can be operated with wastewater that are solely pretreatment by screening of solids or with seawater and brines with up to 25% salinity. The MEC, according to embodiments of the invention, has the potential to dramatically change the cooling tower market to use of non-potable water, as power plant evaporative cooling accounts for approximately 41% of fresh water withdrawals in the US. By using a selective MTM, the transport of microbes to and from the LEM eliminates any spreading airborne toxins with all contaminants and toxins remaining submerged in the LEM. The interface between the LEM at the MTM assures transfer and evaporation occurs at the molecular level, so no formation of droplets of water that can sustain and transmit microbial populations occurs that can be entrained in the working fluid.

FIG. 3 shows incorporation of a multiple-effect MEC, according to embodiments of the invention, into a flat plate heat-and-mass exchanger that incorporates multiple stages of evaporation and condensation into a single component and uses a plurality of LEM sources. In the configuration shown, a pattern of layers of MTM and non-permeable HEMs mediate between different fluid streams. As illustrated in FIG. 3: steam 33 is generated by an external heat source, such as boiler 46, where it condenses in a condensation channel between a pair of HEM 32, generating liquid condensate 34 that can be returned to the boiler in a closed loop via a pump 39 or removed from the system. The heat from this steam condensation within a condensation channel is transferred thought the HEM 32 into an LEM conduit 36 within an evaporation-condensation channel. This heated LEM is process water preheated in a heat exchanger 47 using warm condensate liquid 34 to provide the sensible heat. The process LEM is transmitted via pump 48 into the channel defined by the HEM 32 and the MTM 35. Vapor passes from the MTM 35 contacting the LEM conduit 36 into the evaporation-condensation channel where it condenses into a second liquid 44 on an adjacent second HEM 42 at a lower temperature than the liquid condensate 34. That condensation to second liquid 44 at HEM 42 causes evaporation from a second LEM conduit 46. The concentrated LEM is combined with a source of LEM 50 and delivered via pump 49 in a recycling loop, where the LEM passes through the MTM 45 into an evaporation channel of the MEC where the "dry" gas 37 draws the vapor from the MTM 45 and exhausts it as "wet" gas 38.

According to an embodiment off the invention, FIG. 4 shows a cross-section of an exemplary, non-limiting configuration of a flat plate heat-and-mass exchanger that can accommodate the equivalent MEC to that shown in FIG. 3. Two separate subcomponents facilitate the implementation of the MECs. The first subcomponent is an "air slat" 51 that separates and supports adjacent MTMs to provide a space for air to flow in 57 and out 58 of the evaporation channels while sealed from the steam 53 its condensate 54 inlets and outlets and inlets 55 and outlets 56 for water or other LEM 55 passing in and out of internal steam condensation channels and evaporation-condensation channels. The second sub-component is a "steam slat" 52 with a complementary arrangement to the air slat but is vacuum sealed and comprises a suitable non-permeable heat transfer material to distribute steam between adjacent pairs of HEMs where the steam condenses in the MECs and seal the steam channels from the evaporation-condensation channels. The air slats and steam slats alternated in a stacked arrangement with seals between the compartments that permits the interstitial space to be filled with the water or other evaporative medium.

In many air conditioning applications, a stream of moist warm air 68 is chilled and dehumidified to cool dry air 67. In an embodiment of the invention, an evaporative chiller and dehumidifier comprises an LEM that is water can be confined between a pair of MTMs 62, as shown in FIG. 5. On the opposite side of the first MTM, a vacuum evaporation conduit can be formed between a non-permeable barrier 72 and the first MTM 62. The MTM 62 allows water molecules to pass from the water LEM channel 66 into the vacuum to provide a water vapor 70 with evaporation, which causes cooling. The magnitude of the applied vacuum 69 controls the water temperature in the water of the LEM channel 66. Simultaneously, a stream of moist air 68 is introduced in a condensation conduit defined by the second MTM 62 on the opposite side of the LEM channel 66 and a second non-permeable barrier 62. The chilled water channel acts as desiccate drawing water molecules from the air stream to dehumidify the moist air 68 to cool dry air 67. The warm air 68 and the cool water LEM channel 66 exchange sensible heat to reduce the air stream's temperature. This evaporative chiller and dehumidifier can be coupled with the MECs, according to embodiments of the invention, or may be used alone or in conjunctions with other air conditioning devices. For example, the moist exhaust air of the multiple effect MEC can be passed across the LEM channel 66 transferring its humidity and some heat to the vacuum. The vacuum source can be a mechanical vacuum pump, a diffusion pump, or an aspirator, such as a water aspirator. When the vacuum source is an aspirator, the water or other fluid source to the aspirator can be provided by a flow in the MEC, for example, by the LEM condensate flow, the LEM outlet flow, the liquid outlet of the condensation channel, any water flow to any LEM inlet, or the fluid source can be extra to the MEC.

All patents and patent applications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A membrane evaporative condenser (MEC) comprising a repeating sequence of channels for evaporation and/or condensation, each sequence of channels comprising:
   a condensation channel for condensation of a vapor to a liquid, the condensation channel comprising:
      two walls of a non-permeable material where both walls of the non-permeable material of channels that do not terminate the repeating sequence of channels is a shared wall with a wall of a non-permeable material of a LEM conduit for containment of a liquid evaporative medium (LEM), the LEM conduit comprising:
         a first wall of the non-permeable material; and
         a second wall comprising a moisture transfer membrane (MTM), the surface of the MTM outside of the LEM conduit being a site for evaporating the LEM from the LEM conduit;
      at least one LEM inlet to the LEM conduit;
      at least one vapor inlet for the vapor; and
      at least one liquid outlet for the liquid;
   zero to one hundred evaporation-condensation channels, each comprising:
      the LEM conduit;
      a second wall comprising the non-permeable material, the second wall being a site for condensation of the LEM to an LEM condensate that evaporates from the MTM;
      at least one LEM inlet and at least one LEM outlet to the LEM conduit; and
      at least one LEM condensate outlet;
   an evaporation channel, wherein all of the walls that do not terminate the repeating sequence of channels comprise LEM conduits and a space between the MTMs of the LEM conduits or a terminal space between the MTM and a non-permeable wall of a terminal evaporation channel, and wherein each of the evaporation channels has at least one working fluid inlet and a wet working fluid outlet; and
   an evaporative chiller and dehumidifier comprising an LEM channel comprising a first MTM and a second MTM, a vacuum evaporation conduit between the first MTM and a first wall comprising a non-porous material, and a condensation conduit comprising the second MTM and a second wall comprising a non-porous material, wherein the wet working fluid outlet of the evaporation channel is configured to maintain a vapor pressure of a wet working fluid of the wet working fluid outlet of the evaporation channel lower than a vapor pressure of the LEM channel of the evaporative chiller and dehumidifier.

2. The MEC according to claim 1, wherein the sequence of channels has zero evaporation-condensation channels, comprising a repeating sequence of alternating condensation channels and evaporation channels.

3. The MEC according to claim 1, wherein the sequence of channels has 1 to 10 evaporation-condensation channels in the sequence of channels.

4. The MEC according to claim 1, wherein the MTM is a composite membrane with a solid pervaporation coating, and wherein the LEM is water.

5. The MEC according to claim 1, wherein the LEM is from one source.

6. The MEC according to claim 1, wherein the LEM is from a plurality of sources.

7. The MEC according to claim 1, wherein the LEM is non-potable water.

8. The MEC according to claim 7, further comprising a filter before the LEM inlet.

9. The MEC according to claim 1, further comprising a vapor compression device, wherein the wet working fluid of the wet working fluid outlet of the evaporation channel is input to the compression device and the output of the compression device is delivered to the vapor inlet of the condensation channel.

10. The MEC according to claim 1, wherein the LEM of the evaporation channel and the LEM of the evaporation-condensation channel are from different sources.

11. The MEC according to claim 10, further comprising at least one pump coupled to at least one of the condensation channel, the evaporation-condensation channel, and the evaporation channel.

12. The MEC according to claim 1, wherein the LEM is water and the LEM condensate is purified water.

13. A method of preparing an MEC according to claim 1, comprising:
   providing a plurality of condensation channels and evaporation channels in an alternating sequence;
   connecting the vapor inlets to at least one conduit for connection to a vapor source;
   connecting the LEM inlets to at least one conduit for connection to a LEM source;
   connecting the working fluid inlet to at least one conduit for connection to a working fluid source;
   providing the evaporative chiller and dehumidifier;
   maintaining the vapor pressure of the wet working fluid of the wet working fluid outlet of the evaporation channel lower than the vapor pressure of the LEM channel of the evaporative chiller and dehumidifier;
   connecting the vacuum evaporation conduit to a vacuum source;
   connecting the liquid outlets to at least one conduit to at least one reservoir, recycling device, or drain; and
   optionally, connecting the LEM outlets to at least one conduit to at least one reservoir, recycling device, or drain.

14. The method of preparing an MEC according to claim 13, further comprising:
   providing a plurality of evaporation-condensation channels; and
   connecting the LEM condensate outlets to at least one conduit to at least one reservoir, recycling device, or drain.

15. The method of preparing an MEC according to claim 14, wherein the vacuum source is an aspirator connected to a fluid flow within the MEC.

16. A device comprising the MEC according to claim 1, wherein the device is:
   an HVAC; a process condenser; a distillation device; a crystallization device; a water treatment device; or a fluid treatment device.

* * * * *